United States Patent [19]

Reimanis et al.

[11] Patent Number: 4,968,336
[45] Date of Patent: Nov. 6, 1990

[54] PLASMA ETCH VAPOROUS EXHAUST COLLECTION SYSTEM

[75] Inventors: Andrew R. Reimanis, Roseville; Keith A. Ruffner, Colfax; Marvin G. March, Lincoln, all of Calif.

[73] Assignee: NEC Electronics Incorporated, Mountain View, Calif.

[21] Appl. No.: 352,430

[22] Filed: May 16, 1989

[51] Int. Cl.$^5$ .............................................. B01D 47/00
[52] U.S. Cl. ........................................ 55/227; 55/233; 55/309; 55/257.3
[58] Field of Search ...................... 55/71, 72, 90, 233, 55/227, 257, 257.3, 260, 309, 312; 261/98, 116

[56] References Cited

U.S. PATENT DOCUMENTS

| | | | |
|---|---|---|---|
| 218,611 | 8/1879 | Wilkinson | 261/98 |
| 1,476,292 | 12/1923 | Galusha | 55/233 |
| 3,768,234 | 10/1973 | Hardison | 55/223 |
| 3,993,448 | 11/1976 | Lowery | 261/116 |
| 4,470,830 | 9/1984 | Aubert | 55/94 |

*Primary Examiner*—Bernard Nozick
*Attorney, Agent, or Firm*—Skjerven, Morrill, MacPherson, Franklin & Friel

[57] ABSTRACT

A system for treating and removing toxic by-products of semiconductor plasma etching processes utilizes a collection box having various treatment chambers in seriatim. A heated inlet conducts a vaporous process stream into an expansion chamber where the gas is expanded. The expanded gas flows over a baffle weir into a packing chamber filled with plastic media spheres. In the upper reaches of the packing chamber but below the weir top, a deionized water atomizer sprays deionized water to humidify and cool the expanded gases which allows the water soluble toxic by-products, such as aluminum trichloride, to initially precipitate out and condense on the spheres. With continued water flow the by-products solubilize in the water and flow to an acid drain. Remaining vaporous gaseous exhaust products pass under a weir defining one side of the packing chamber up to an exhaust chamnber where a series of inclined staggered baffles and a strainer trap remove water from the gaseous exhaust and return it to the acid drain. Various pressure sensors, by-pass and shut-off arrangements assure safety and efficient operation of the system and method.

9 Claims, 2 Drawing Sheets

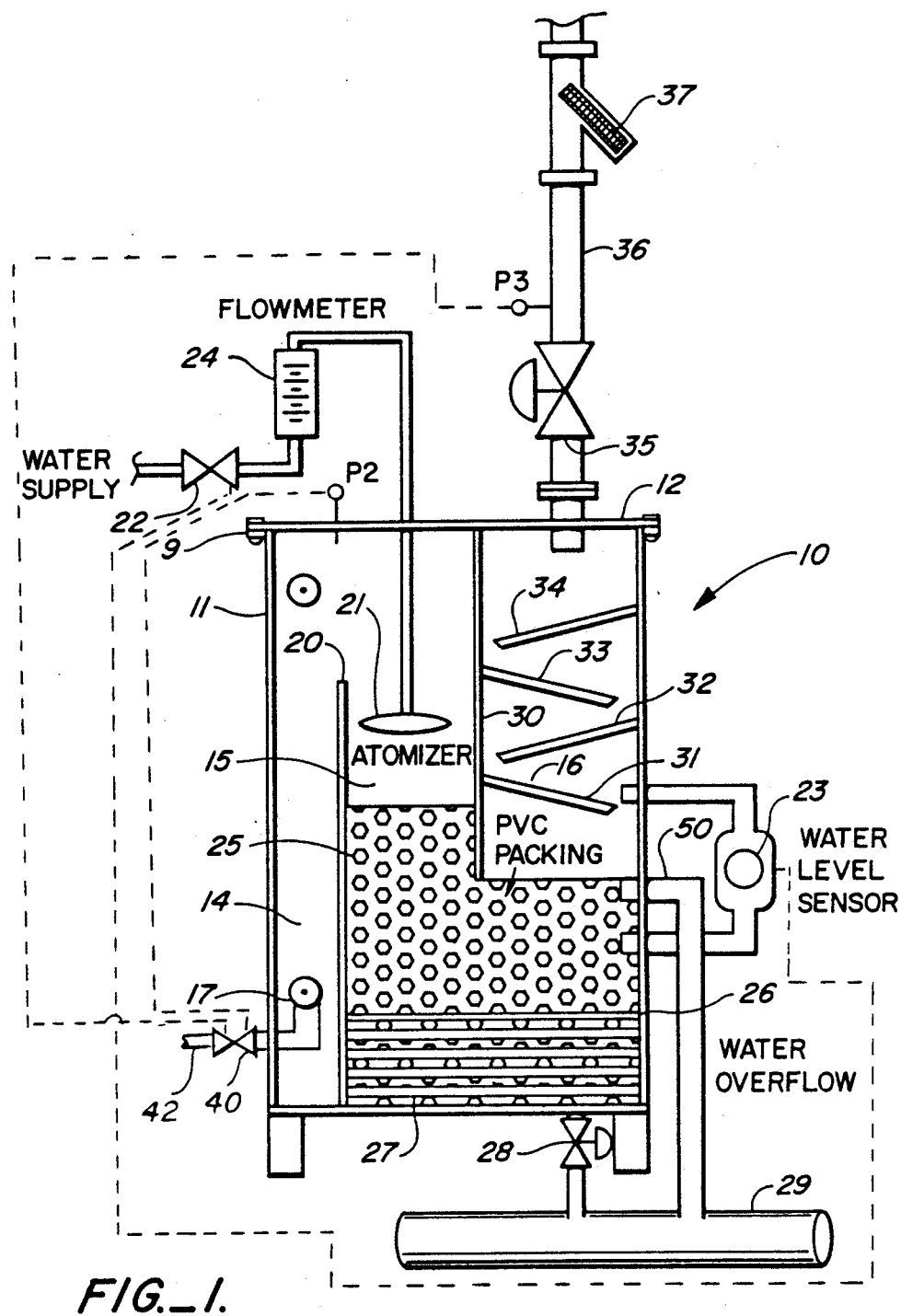
FIG._1.

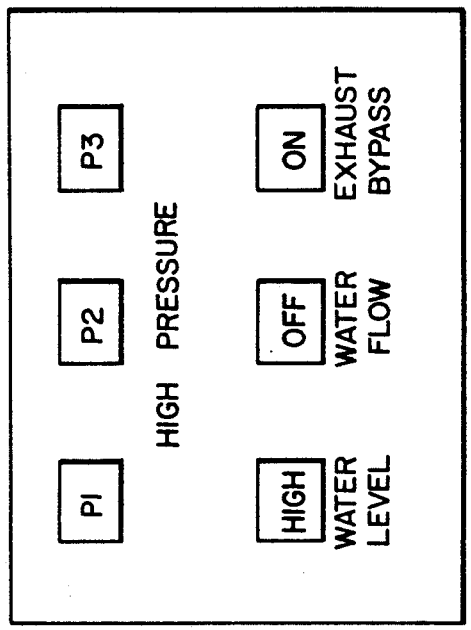
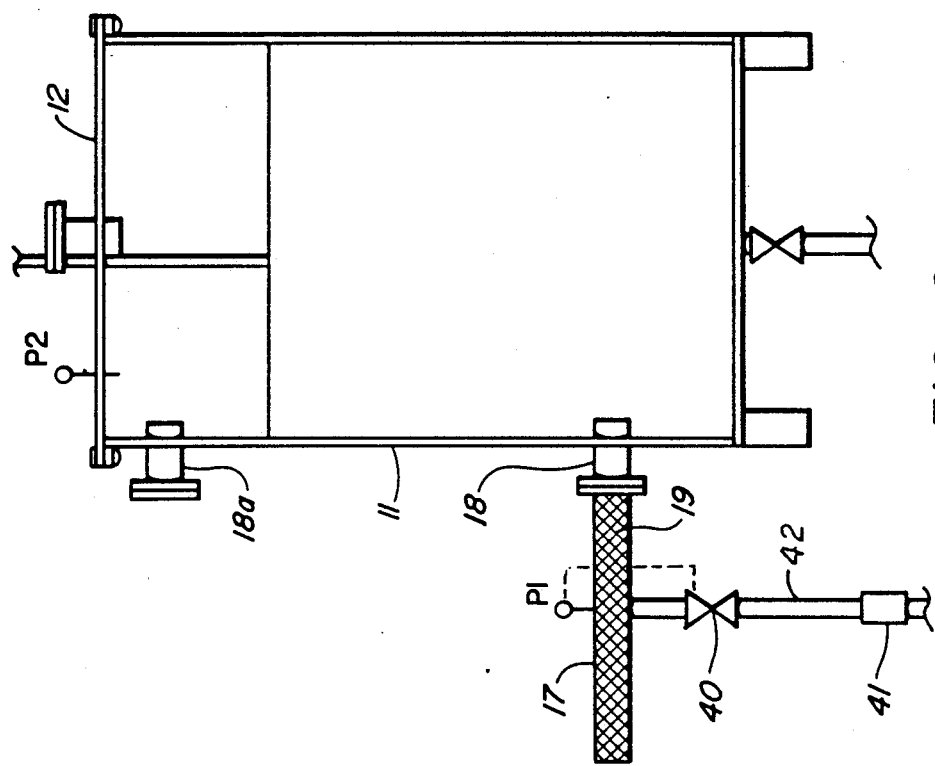

PLASMA ETCH VAPOROUS EXHAUST COLLECTION SYSTEM

This invention concerns a system and method for treating the exhaust resultant from a semiconductor etching process. More particularly, the invention relates to a system for treating and removing toxic by-products from the vaporous exhaust of a etching process.

BACKGROUND OF THE INVENTION

Plasma etch processes are utilized in the preparation of semiconductor devices. Process by-products such as $BCl_3$, $B_2O_3$, and $Al_2Cl_3$ are formed which tend to precipitate out of a vaporous exhaust so as to plug and contaminate facility exhaust lines. Mechanical exhaust filters such as the canister-type with disposable absorption elements therein or large exhaust scrubbing units have been employed to minimize this problem. As a result of plugging of exhaust lines there is a danger of system over pressures with possible resultant catastrophic failures in the etching reaction chambers or downstream filtering or scrubbing system. A further detriment of prior art systems is that they are normally high volume devices of large overall size and must be maintained on a weekly or other short term basis to change cleaning elements.

SUMMARY OF THE INVENTION

The present invention safely removes the hazardous toxic process by-products from the exhaust stream of a plasma etch process used in semiconductor device production processes. The etch by-products are removed from the plasma reaction chamber where semiconductor etching is performed normally by a rotary piston-type vacuum pump. The exhaust stream is a vaporous stream containing toxic, highly corrosive water soluble compounds in suspension such as aluminum trichlorides.

The exhaust products enter the collection system through a heated pipe to prevent condensation of the compounds. Pipe diameter is kept small to maintain a high stream velocity which also serves to prevent condensation. The exhaust stream is injected into a relative small collection box (38cm × 38cm × 66cm high) having a series of spaced interior chambers. The exhaust stream is introduced first into an expansion chamber where the stream expands. The expanded vapor stream passes over an upper weir in the collector box from whence it flows co-currently with a continuous, downwardly-directed deionized water spray having droplet sizes of from 1 to about 100 microns which provides a humid atmosphere, i.e. about 85-90% relative humidity. The combination of expansion and wetting results in precipitation of the toxic compounds which are adsorbed on the surfaces of a spherical packing media such as polypropylene having a sphere size of about 5 cm diameter, in a downstream packing chamber. The continued impingement of the water spray and the draining of water through the interstices between the media washes the adsorbed precipitates off of the media. The precipitates are dissolved in the water and are directed by gravity to an acid waste drain. The remaining vaporous exhaust stream flows upwardly to an exhaust chamber containing a series of baffles and a strainer trap to minimize the carry-over of water with dissolved toxic compounds into a downstream fume exhaust.

High pressure conditions are monitored at the inlet pipe, in the volume between the expansion chamber and the water atomizer, and between the exhaust baffling and strainer trap. If an overpressure occurs, the collection system will automatically go into a by-pass mode and flow to the inlet pipe will go directly to the fume exhaust thru a pressure relief valve. In the event of acid drain restriction or high water inlet flow, an overflow drain directs water into the acid drain. If the overflow condition persists a water level sensor between the packing chamber and exhaust chamber will execute a signal to close the water supply valve for the wetting spray.

BRIEF DESCRIPTION OF THE DRAWINGS

FIG. 1 is a schematic front view of the collection system having the front vertical wall removed.

FIG. 2 is a schematic side view of the system having a side wall removed.

FIG. 3 is a front view of the system control status panel.

DETAILED DESCRIPTION

FIG. 1 illustrates the invention wherein a collector box 10 comprises a rectangular vessel 11 generally made of 316L stainless steel for corrosion resistance sealed at its top by a cover 12 having a series of chambers, namely gas expansion chamber 14, a media packing chamber 15 and an exhaust chamber 16. An inlet means 17 is provided in chamber 14 for introducing by pressure differential across the vessel a vaporous, toxics-containing exhaust stream from a semiconductor plasma etch process installation (not shown). Typical etchants are $Cl_2$, $BCl_3$, and $CF_4$ which at temperatures of about 40 to 50° C. over an etching time of about 20 minutes to about 25 minutes etches a silicon semiconductor substrate to depth dimensions on the order of one micron. An inlet pipe 18, preferably of a small diameter of about 2.5 cm to maintain stream velocity, is covered by a heater wrapping 19 such as a silicon rubber wire wound flexible heater which is electrically heated so that the exhaust stream is about 50° to 60° C. This prevents condensation in the pipe. Alternatively an inlet pipe 18a may be provided in an upper region of chamber 14, so as to accommodate a selected vacuum pump.

The exhaust stream then enters chamber 14 and is expanded upon reaching the open volume of the chamber. The resultant expanded gaseous vapor is transported by the pressure differential over a vertical weir 20 into packing chamber 15, the upper reaches thereof containing a spray nozzle 21. Nozzle 21 may be a Model 456 device, manufactured and sold by SMC Co. of St. Paul, Minnesota. Supply water, normally deionized water, is passed through a pipe having a N.C. valve 22 controlled by a water level sensor 23. The supply water then passes through a flowmeter 24 and into nozzle 21 where it is atomized into a fine mist to raise the humidity in chamber 15 to about 85-90% relative humidity. A bed 25 of spheres or other packing, made from polypropylene, polyvinylchloride or other material having a large surface area and being corrosive resistant and easily washable, is formed by stacking the spheres on the bottom of the vessel until the bed reaches the desired depth. The bed typically will have a depth of about 15 cm but may be varied dependent on gas flow. Level 27 represents the resident water level in the box. The spheres fill the bottom portion of the vessel and water is allowed to fill to an equilibrium level of about 10 cm before the drain valve is opened to make the system ready for operation.

As the expanded vaporous stream comes into contact with the deionized water spray of the water supply it becomes more humid and cooler allowing certain of the suspended particles and toxic compounds to precipitate out of the vaporous stream and to condense on the packing spheres. Through an adsorption process the precipitates are initially lodged on the sphere surfaces and as they build up are dislodged and washed off by the continuing stream of water entering the media bed from nozzle 21. The toxic components are soluble in water at the resultant temperature/pressure conditions, about 20° C. to about 25° C., at 10–12 psia in the packed bed. The waste stream containing the solubilized compounds is drained out the bottom of chamber 15 through valve 28 for disposal into an acid waste drain 29 for subsequent authorized treatment and disposal.

The remaining gaseous products are transported upwardly into chamber 16 after they have passed through the bed 25 and under a vertical wall 30 separating chambers 15 and 16. The exhaust stream passes through a series of downwardly inclined baffles 31–34 alternately extending from wall 30 and an exterior wall of chamber 16. Water vapor in the exhaust will condense on the baffles and flow back into the media bed, washing the bed further as it passes therethrough and enters into drain 29. A valve 35 is provided in a vapor exhaust stack 36 followed by a strainer trap 37 preventing water and its solubilized toxic compounds from exhausting to a conventional fume exhaust (not shown) for any necessary additional scrubbing or cleaning.

Importantly to the operation of the above described device and the practice of the method are several key safety features Pressure is monitored at three locations by pressure sensors P1, P2 and P3 which send signals to a status panel (FIG. 3) indicating whether or not a high pressure condition exists. A visual and auditory alarm will alert an operator to overpressure conditions. This will facilitate troubleshooting to find any restriction causing overpressure.

If any over pressure condition exists, the collector box system will go into the bypass mode and the exhaust stream will flow through the pressure relief valve 40 (FIG. 2) and directly into the fume exhaust 42. The connection of the sensors P1, P2 and P3 is schematically illustrated by the dash lines from each sensor to the fume exhaust 42 and sensor 23 to the water supply valve 22. A flow sensor switch 41 will monitor that this bypass is working. In case of drain restriction or high water inlet flow, an overflow drain 50 (FIG. 1) directs water into the acid drain. A water level sensor 23 will send a signal to close the water supply valve 22 in the event the overflow condition persists The collector box lid 12 is removable to allow inspection and cleaning of internal parts. The lid is sealed by means of an O-ring 9.

The above described system and method provide a safe, effective means for removing etching process by-products. It is very compact having dimensions, in a typical installation, of about 38 cm by 38 cm by 66 cm high, so it can be installed adjacent a vacuum pump used to remove the etch process exhaust stream and thus can prevent settling out of condensed by-products in exhaust mains on the way to the facility scrubber. It safely eliminates exhaust line clogging problems which are common to plasma etch exhaust stream handling.

The above description of the preferred embodiment of this invention is intend to be illustrative and not limiting Other embodiments of this invention will be obvious to those skilled in the art in view of the above disclosure.

We claim:

1. An exhaust collection system for removal of process reaction by-products of a semiconductor etching production process in a vaporous exhaust stream wherein the reaction by-products are toxic, highly corrosive water soluble compounds in suspension, said system comprising:

a collector box, said collector box comprising a gas expansion chamber, a packing chamber in flow communication with said expansion chamber and an exhaust chamber in flow communication with said packing chamber;

a baffle weir extending between said expansion chamber and said packing chamber;

inlet means in said expansion chamber for introducing a vaporous exhaust stream into said expansion chamber at a velocity and temperature to allow expansion of said exhaust stream and to prevent condensation of said toxic compounds in said expansion chamber;

water spray means extending downstream from said baffle weir for humidifying and cooling said vaporous exhaust after said vaporous exhaust has passed through said expansion chamber and over said weir and for effecting precipitation of said toxic compounds;

packing means providing an interstitial flow path in said packing chamber for receiving precipitated toxic compounds from said vaporous exhaust stream thereon, said spray means being directed into said packing chamber co-currently with said exhaust stream so as to wash toxics compounds from said packing means;

drain means for draining toxic compounds-containing wash water from said packing chamber to waste; and exhaust means extending upwardly from said packing chamber for removing vaporous exhaust products cleansed of toxic compounds from said exhaust chamber.

2. An exhaust collection system for removal of process by-products of a production process in a vaporous exhaust stream wherein the by-products are toxic, highly corrosive water soluble compounds in suspension, said system comprising:

a collector box, said collector box comprising a gas expansion chamber, a packing chamber in flow communication with said expansion chamber and an exhaust chamber in flow communication with said packing chamber;

a baffle weir extending between said expansion chamber and said packing chamber;

inlet means in said expansion chamber for introducing a vaporous exhaust stream into said expansion chamber at a velocity and temperature to allow expansion of said exhaust stream and to prevent condensation of said toxic compounds in said expansion chamber;

water spray means extending downstream from said baffle weir for humidifying and cooling said vaporous exhaust after said vaporous exhaust has passed through said expansion chamber and over said weir;

packing means providing an interstitial flow path in said packing chamber for receiving condensed precipitated toxic compounds from said vaporous stream thereon, said spray means being directed into said caking chamber so as to wash toxic compounds from said packing means;

drain means for draining toxic compounds-containing wash water from said packing chamber;

exhaust means extending upwardly from said packing chamber for removing vaporous exhaust products cleansed of toxic compounds from said exhaust chamber; and further comprising a water level sensor extending between said packing chamber and said exhaust chamber; overflow drain means adjacent a transition zone between said packing chamber and said exhaust chamber for draining excess water overflow into said drain means; and valve means for controlling a water supply to said water spray means, said valve means being closable in response to a water level sensor overflow condition signal.

3. An exhaust collection system for removal of process by-products of a production process in a vaporous exhaust stream wherein the by-products are toxic, highly corrosive water soluble compounds in suspension, said system comprising:

a collector box, said collector box comprising a has expansion chamber, a packing chamber in flow communication with said expansion chamber and an exhaust chamber in flow communication with said packing chamber;

a baffle weir extending between said expansion chamber and said packing chamber;

inlet means in said expansion chamber for introducing a vaporous exhaust stream into said expansion chamber at a velocity and temperature to allow expansion of said exhaust stream and to prevent condensation of said toxic compounds in said expansion chamber;

water spray means extending downstream from said baffle weir for humidifying and cooling said vaporous exhaust after said vaporous exhaust has passed through said expansion chamber and over said weir;

packing means providing an interstitial flow path in said packing chamber for receiving condensed precipitated toxic compounds from said vaporous stream thereon, said spray means being directed into said packing chamber so as to wash toxic compounds from said packing means;

drain means for draining toxic compounds-containing wash water from said packing chamber;

exhaust means extending upwardly from said packing chamber for removing vaporous exhaust products cleansed of toxic compounds from said exhaust chamber; and wherein said inlet means includes an inlet pipe and heating means for heating said pipe to prevent condensation of toxic compounds in said gas expansion chamber.

4. The exhaust collection system of claim 3 wherein said inlet means is positioned adjacent a bottom portion of said expansion chamber and said baffle weir extends across a top portion of said expansion chamber, said water spray means being positioned below a top of said baffle weir and offset from said expansion chamber so as to prevent flow of spray water into said expansion chamber.

5. The exhaust collection system of claim 4 wherein said packing means comprises a fixed media bed of plastic spherical balls and said drain means comprising a toxic compounds-solution waste drain and a valve for controlling flow of toxic compounds-solution from said packing chamber.

6. The exhaust collection system of claim 5 wherein said exhaust chamber extends into said packing chamber and said exhaust means comprises a labyrinth of downwardly-inclined baffles for de-entraining water in said cleansed exhaust products and for returning de-entrained water to said drain means.

7. The exhaust collection system of claim 6 wherein said exhaust means further comprising a exhaust stack extending from said exhaust chamber, said exhaust stack including a strainer trap for removing water vapor from said cleansed exhaust products.

8. The exhaust collection system of claim 6 further including a pressure sensor connected to an interior of said inlet pipe and means responsive to said sensor for bypassing said vaporous exhaust stream to a fume exhaust downstream of said exhaust means when an overpressure is sensed in said inlet pipe.

9. The exhaust collection system of claim 6 further including a pressure sensor in a transition zone between said expansion chamber and said packing chamber and above said spray means and means responsive to said sensor for bypassing said vaporous exhaust stream to a fume exhaust downstream of said exhaust means when an overpressure is sensed in said transition zone.

* * * * *